United States Patent
Kono et al.

(10) Patent No.: US 9,349,185 B2
(45) Date of Patent: May 24, 2016

(54) IMAGE PROCESSING DEVICE, IMAGE PROCESSING METHOD, AND COMPUTER READABLE RECORDING DEVICE

(75) Inventors: Takashi Kono, Tachikawa (JP); Yamato Kanda, Hino (JP); Makoto Kitamura, Hachioji (JP); Takehiro Matsuda, Hachioji (JP); Masashi Hirota, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 440 days.

(21) Appl. No.: 13/597,876

(22) Filed: Aug. 29, 2012

(65) Prior Publication Data

US 2013/0051680 A1 Feb. 28, 2013

(30) Foreign Application Priority Data

Aug. 31, 2011 (JP) .................................. 2011-190072

(51) Int. Cl.
*G06K 9/46* (2006.01)
*G06T 7/00* (2006.01)
*G06K 9/00* (2006.01)
*G06T 5/00* (2006.01)

(52) U.S. Cl.
CPC .......... *G06T 7/0081* (2013.01); *G06K 9/00147* (2013.01); *G06T 5/002* (2013.01); *G06T 7/0012* (2013.01)

(58) Field of Classification Search
None
See application file for complete search history.

(56) References Cited

U.S. PATENT DOCUMENTS

| | | | | |
|---|---|---|---|---|
| 5,771,318 | A * | 6/1998 | Fang et al. | 382/261 |
| 5,943,441 | A * | 8/1999 | Michael | 382/199 |
| 2009/0202124 | A1 * | 8/2009 | Matsuda et al. | 382/128 |

FOREIGN PATENT DOCUMENTS

| | | | |
|---|---|---|---|
| JP | 2002325762 | A * | 11/2002 |
| JP | 2006-288879 | A | 10/2006 |
| JP | 2007-244519 | A | 9/2007 |
| JP | 2008-093172 | | 4/2008 |
| JP | 2008-307229 | | 12/2008 |
| JP | 2010-187756 | A | 9/2010 |
| JP | 2011-024628 | A | 2/2011 |

OTHER PUBLICATIONS

Filho et al., "An Adaptive Fuzzy Segmentation of Intravascular Ultrasound Images," 2004, 4 pages.*
English Machine Translation of JP 2002-325762 A, 23 pages.*
Japanese Office Action dated Apr. 28, 2015 from Japanese Patent Application No. 2011-190072, together with an English language translation.

* cited by examiner

*Primary Examiner* — Sumati Lefkowitz
*Assistant Examiner* — Ryan P Potts
(74) *Attorney, Agent, or Firm* — Scully, Scott, Murphy & Presser, P.C.

(57) ABSTRACT

An image processing device includes: a non-target region detecting unit that detects a region that is not to be examined as a non-target region from an image; a pixel-of-interest region setting unit that sets a pixel-of-interest region in a predetermined area including a pixel-of-interest position in the image; a surrounding region determining unit that determines a surrounding region, which is an area for acquiring information for use in forming a reference plane with respect to the pixel-of-interest position, based on the non-target region; a reference plane forming unit that forms the reference plane based on the information in the surrounding region; and an outlier pixel detecting unit that detects an outlier pixel having a pixel value numerically distant from circumferential values based on a difference between corresponding quantities of the reference plane at each pixel position and of the original image.

18 Claims, 15 Drawing Sheets

IMAGE PROCESSING DEVICE, IMAGE PROCESSING METHOD, AND COMPUTER READABLE RECORDING DEVICE

CROSS-REFERENCE TO RELATED APPLICATIONS

This application is based upon and claims the benefit of priority from Japanese Patent Application No. 2011-190072, filed on Aug. 31, 2011, the entire contents of which are incorporated herein by reference.

BACKGROUND OF THE INVENTION

1. Field of the Invention

The present invention relates to an image processing device, an image processing method, and a computer readable recording device for detecting a specific region from an image.

2. Description of the Related Art

As a technique for detecting a specific region from an image, Japanese Laid-open Patent Publication No. 2008-93172 discloses a configuration of an image processing device. In the image processing device, with respect to a body cavity image acquired by imaging the biological interior, a pixel value change amount between a pixel of interest and a plurality of circumferential pixels positioned around the pixel of interest; and circumferential pixel value change amount between the circumferential pixels are calculated, respectively. Based on the computing result of the pixel value change amount and the circumferential pixel value change amount, a lesion candidate region is detected in the body cavity image, and then the characteristic of the detected lesion candidate region is extracted, thereby detecting a lesion region from the lesion candidate region based on the extraction result.

Japanese Laid-open Patent Publication No. 2008-307229 discloses a configuration of an image processing device, wherein a convex lesion candidate region and a concave lesion candidate region are extracted based on pixels showing change in pixel values compared with circumferential pixels, a region corresponding to a shade of a groove formed by body cavity walls sandwiching the region in the concave lesion candidate region is judged as a groove region, and a lesion region is extracted by excluding the concave lesion candidate region determined as the groove region from the concave lesion candidate region.

SUMMARY OF THE INVENTION

An image processing device according to an aspect of the present invention includes: a non-target region detecting unit that detects a region that is not to be examined as a non-target region from an image; a pixel-of-interest region setting unit that sets a pixel-of-interest region in a predetermined area including a pixel-of-interest position in the image; a surrounding region determining unit that determines a surrounding region, which is an area for acquiring information for use in forming a reference plane with respect to the pixel-of-interest position, based on the non-target region; a reference plane forming unit that forms the reference plane based on the information in the surrounding region; and an outlier pixel detecting unit that detects an outlier pixel having a pixel value numerically distant from circumferential values based on a difference between corresponding quantities of the reference plane at each pixel position and of the original image.

An image processing method according to another aspect of the present invention includes: detecting a region that is not to be examined from an image as a non-target region; setting a pixel-of-interest region in a predetermined area including a pixel-of-interest position in the image; determining a surrounding region that is an area for acquiring information used for forming a reference plane with respect to the pixel-of-interest position, based on the non-target region, forming the reference plane based on the information in the surrounding region; and detecting an outlier pixel having a pixel value numerically distant from circumferential values based on a difference between corresponding quantities of the reference plane at each pixel position and of the original image.

A computer readable recording device according to still another aspect of the present invention has an executable program stored thereon, wherein the program instructs a processor to perform: detecting a region that is not to be examined from an image as a non-target region; setting a pixel-of-interest region in a predetermined area including a pixel-of-interest position in the image; determining a surrounding region that is an area for acquiring information used for forming a reference plane with respect to the pixel-of-interest position, based on the non-target region, forming the reference plane based on the information in the surrounding region; and detecting an outlier pixel having a pixel value numerically distant from circumferential values based on a difference between corresponding quantities of the reference plane at each pixel position and of the original image.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an image processing device, an image processing method, and an image processing program according to embodiments of the invention will be described with reference to the accompanying drawings. It should be noted that the invention is not limited by these embodiments. In each of the drawings, the same components are indicated by the same reference signs.

Hereinafter, image processing for an intra-luminal image acquired by imaging the interior of the lumen of a subject (may be simply referred to as an image hereinafter) by a medical observation device such as an endoscope will be described as an example. Such an intra-luminal image may be a color image having pixel levels (pixel values) for respective color components of R (red), G (green), and B (blue), for example. Intra-luminal images typically show mucous membranes in a digestive tract, and sometimes show food residues (may be simply referred to as residues hereinafter), bubbles, and the like. A target region to be examined in an intra-luminal image is basically a mucous membrane region, and in addition to residues and bubbles, shadows where an illuminating light did not reach and boundaries (grooves) of structures are not included in a target region to be examined.

It is to be noted that the invention is not limited to intra-luminal images but can be widely applied to image processing devices for detecting specific regions in other general images.

First Embodiment

Figure 1:
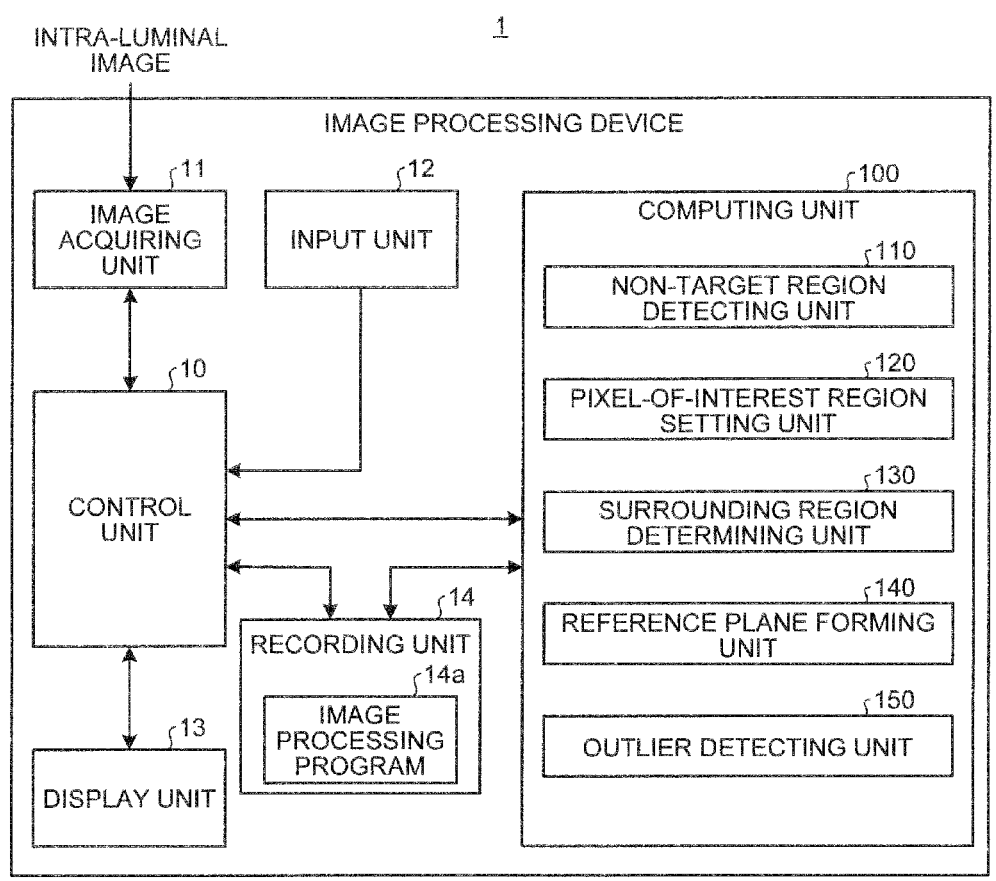
FIG. 1 is a block diagram illustrating a configuration of an image processing device according to a first embodiment.

FIG. 1 is a block diagram illustrating a configuration of an image processing device according to a first embodiment of the invention. As illustrated in FIG. 1, an image processing device 1 includes a control unit 10 for controlling an operation of the image processing device 1 as a whole; an image acquiring unit 11 for acquiring image data of an intra-luminal image that is imaged by a medical observation device; an input unit 12 for receiving an input signal input from the outside; a display unit 13 for displaying a screen including an intra-luminal image and various information; a recording unit 14; and a computing unit 100 for performing a computing process to detect an abnormal region from an intra-luminal image.

The control unit 10 is realized by a hardware such as a CPU, and performs instructions, data transfer, and the like to each of the components constituting the image processing device 1 corresponding to image data input from the image acquiring unit 11, operation signals input from the input unit 12, and the like by reading various programs stored in the recording unit 14 so as to collectively control an operation of the image processing device 1 as a whole.

The image acquiring unit 11 is arbitrarily configured corresponding to an aspect of a system including the medical observation device. For example, when the medical observation device is a capsule endoscope and a portable recording medium is used for exchanging image data of intra-luminal images with the medical observation device, the image acquiring unit 11 may be constituted of a reader device on which the recording medium is detachably mounted and which reads image data stored in the recording medium. Also, when a server that stores image data of intra-luminal images acquired by the medical observation device is provided, the image acquiring unit 11 may be constituted of a communication device or the like linked to the server and may acquire image data by data communications with the server. Alternatively, the image acquiring unit 11 may be constituted of an interface device or the like that inputs image signals from a medical observation device such as an endoscope through a cable.

The input unit 12 may be realized by a keyboard, a mouse, a touch panel, various switches, or the like, and outputs input signals received from the outside to the control unit 10.

The display unit 13 may be realized by a display device such as an LCD, an EL display, or the like.

The recording unit 14 may be realized by: various IC memories including a ROM such as a rewritable flash memory and a RAM, internal or external hard disk drive, or an information recording medium such as a CD-ROM; a reading device thereof; and the like. The recording unit 14 stores image data of an intra-luminal image acquired by the image acquiring unit 11 as well as programs for activating the image processing device 1 and for making the image processing device 1 to execute various functions, data used in executing these programs, and the like. For example, the recording unit 14 stores an image processing program 14a for detecting an outlier pixel value from intra-luminal images and outputting it as an abnormal region.

The computing unit 100 realized by a hardware such as a CPU performs various computing processes for processing image data of an intra-luminal image so as to detect an outlier that is a pixel value numerically distant from its circumferential pixels in the intra-luminal image by reading the image processing program 14a. The computing unit 100 includes: a non-target region detecting unit 110 for detecting a non-target region in an image; a pixel-of-interest region setting unit 120 for setting a pixel-of-interest region in a predetermined area including a pixel-of-interest position in an image; a surrounding region determining unit 130 for determining a surrounding region, which is an area for acquiring information for use in forming a reference plane with respect to the pixel-of-interest position, based on the non-target region; a reference plane forming unit 140 for forming a reference plane based on information in the surrounding region; and an outlier detecting unit 150 as an outlier pixel detecting unit for detecting an outlier pixel having a pixel value numerically distant from circumferential values based on a difference between corresponding quantities of the reference plane at each pixel position and of the original image.

Figure 2:
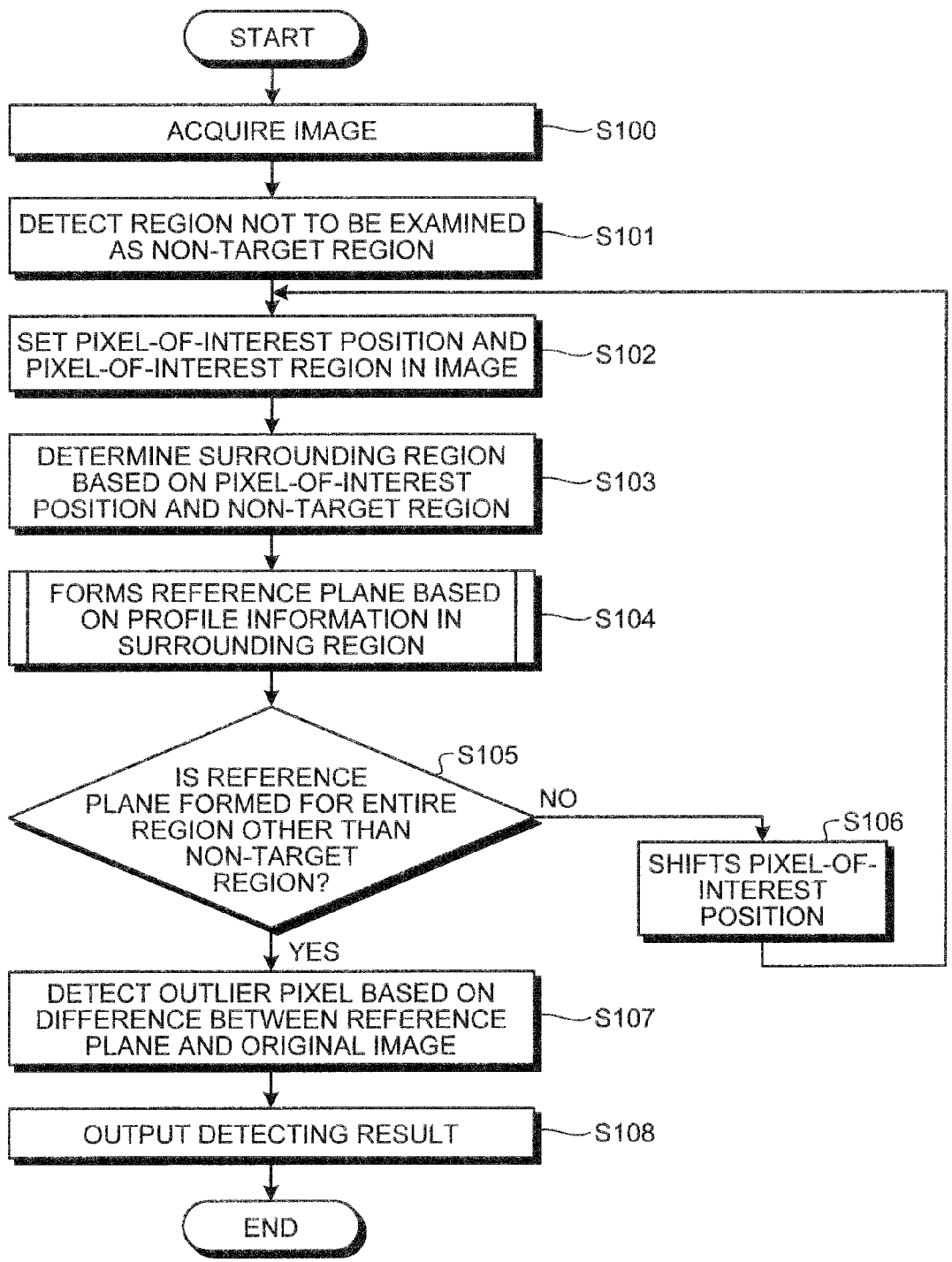
FIG. 2 is a flowchart illustrating an operation of the image processing device illustrated in FIG. 1.

Next, an operation of the image processing device 1 according to the first embodiment will be described. FIG. 2 is a flowchart illustrating an operation of the computing unit 100 illustrated in FIG. 1.

First, in step S100, the computing unit 100 acquires an image that is a process target from the recording unit 14.

In following step S101, the non-target region detecting unit 110 detects a region that is a region not to be examined such as a shadow, a halation, a groove, a residue, and a bubble as a non-target region. Hereinafter, a method of detecting these regions will be respectively described.

(1) Method of Detecting a Shadow and a Halation

A shadow can be detected by computing a colorfulness and a luminance as feature quantities for each of the pixels in an image or for each of regions that are small regions obtained by segmenting the image, projecting these feature quantities into a feature space having two axes of the colorfulness and luminance, and extracting a pixel region corresponding to points of feature quantities distributed lower than predetermined threshold values with respect to both the colorfulness and the luminance. A halation can be detected by extracting a pixel region corresponding to points of feature quantities distributed higher than predetermined threshold values with respect to both the colorfulness and the luminance in a similar feature space. Here, when a process target is an intra-luminal image, a value of an R component having the highest spectral reflectivity among pixel values may be used as a feature quantity instead of the luminance. The threshold values of the colorfulness and the luminance are calculated by providing, as label information, coordinate information of a shadow region and a non-shadow region to a set of intra-luminal images previously acquired as data for learning and recorded in the recording unit 14, and by setting a boundary between the shadow region and the non-shadow region on the feature space of the colorfulness and the luminance based on the label information. The threshold values for the halation are similarly calculated.

(2) Method of Detecting a Groove

A groove can be acquired by threshold value processing of the maximum value of a multi-dimensional quadratic differential output with respect to pixels in an image. Specifically, a pixel-of-interest position is set in an image, and a filter of a predetermined size with respect to the pixel-of-interest position is set, and in the filter, quadratic differential processes in four directions including vertical, horizontal, and oblique directions passing through the pixel-of-interest position are performed, and then the maximum value among output values of these quadratic differential processes is calculated. Such processes are performed for respective pixels in the image by shifting the pixel-of-interest position. Then, the threshold value processing is performed on the maximum values of the quadratic differential calculated for respective pixels so as to detect a groove region.

(3) Method of Detecting a Residue

A residue can be detected by calculating color change components (dichroic ratios) of G/R and B/G from the pixel values of the respective pixels as feature quantities, projecting these feature quantities into a feature space having two axes of G/R and B/G, and extracting pixels corresponding to points of feature quantities distributed on a yellow side with respect to red on this feature space. Threshold values of the dichroic ratios used here may be also calculated by providing label information to an images acquired as data for learning, and by setting a boundary between a residue region and a non-residue region on the feature space of the dichroic ratios similarly to the case of the shadow.

(4) Method of Detecting a Bubble

A bubble can be detected by extracting an image region having a feature quantity of a radio-frequency component of the luminance in an image. A threshold value of the frequency used here may be also set by providing label information to images acquired as data for learning, and by extracting a boundary between distributions of frequency components of a bubble region and a non-bubble region on the feature space of the frequency component similarly to the cases of the shadow and the residue.

Hereinafter, an example of a method of detecting a bubble region will be described. A bubble region can be detected based on the radio-frequency component and the color component. Specifically, a radio-frequency intensity image that illustrates the intensities of radio-frequency components is formed based on a luminance components of an image constituted of RGB components (G component having a wide spectrum band or a luminance value Y (a value calculated by $Y=0.299 \times R+0.587 \times G+0.114 \times B$)). Here, the intensities of the radio-frequency components can be calculated by subtracting, from a pixel value of a target pixel, an average value of the surrounding pixels (3×3, for example) of the pixel of interest. In addition, a setting such as for excluding red regions (regions having G/R values not more than a predetermined threshold, for example) indicating bleeding or the like from a detection target, for example, may be performed based on color information of respective pixels in order to suppress excess detection of the radio-frequency intensity image. Then in a bubble candidate region, a region having an intensity of the radio-frequency component not less than a predetermined threshold value is detected as a bubble region. Here, please refer to Japanese Laid-open Patent Publication No. 2010-115260 as well for a detail of the method of detecting a bubble.

A method of detecting a bubble region by a convolution with a bubble model (refer to Japanese Laid-open Patent Publication No. 2007-313119) may be also used as another method of detecting a bubble.

The non-target region detecting unit 110 provides a label ($E(x_i, y_i)=1$), which indicates the pixel is in a non-target region, to each pixel in the regions detected by these methods (1) to (4), and provides a label ($E(x_i, y_i)=0$), which indicates the pixel is outside of the non-target region (i.e. target region for detecting an abnormal region), to other pixels. Here, ($x_i$, $y_i$) indicates a coordinate of i-th pixel.

Figure 3:
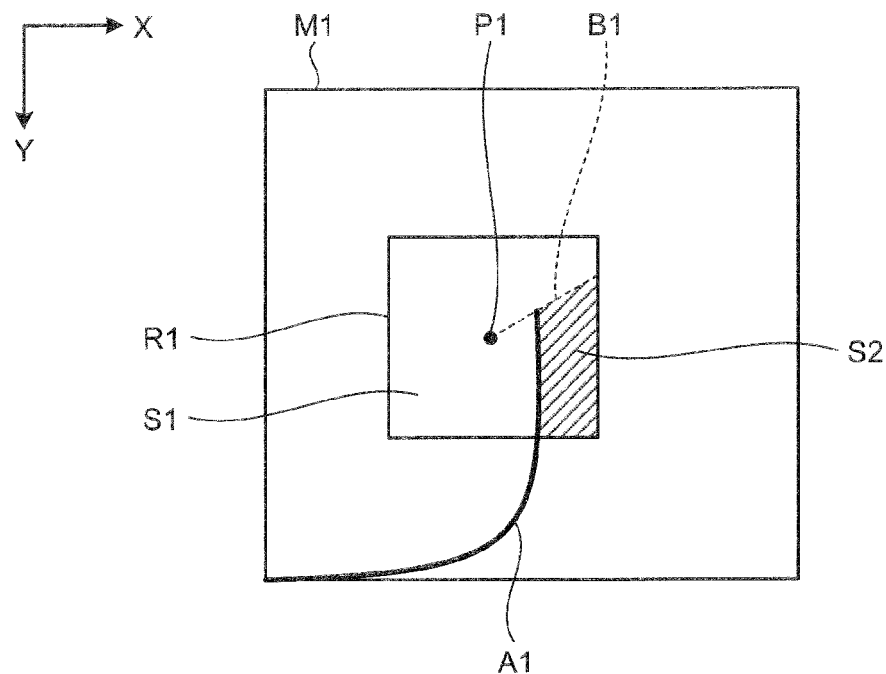
FIG. 3 is a schematic diagram illustrating an example of a pixel-of-interest position and a pixel-of-interest region set in an image.

In step S102, the pixel-of-interest region setting unit 120 sets a pixel-of-interest position in an image, and sets a pixel-of-interest region with respect to this pixel-of-interest position. As the pixel-of-interest region, a rectangle region having a predetermined size with the pixel-of-interest position at the center is set, for example. FIG. 3 illustrates an example where a pixel-of-interest position P1 and a pixel-of-interest region R1 are set with respect to an image M1. Here, in the image M1, a groove A1 is detected as a non-target region.

In step S103, the surrounding region determining unit 130 determines a surrounding region used for forming a reference plane based on the pixel-of-interest position and the non-target region. At this time, in the first embodiment, an area that includes the pixel-of-interest position and does not exceed the non-target region in the pixel-of-interest region is determined as the surrounding region. For example, in the case of the image M1, a region S1 that does not exceed the non-target region A1 as viewed from the pixel-of-interest position P1 (i.e. a region excluding a region S2 that is surrounded by the non-target region A1, a boundary B1 passing through the non-target region A1 and the pixel-of-interest position P1, and the pixel-of-interest region R1) is determined as the surrounding region.

Figure 4:
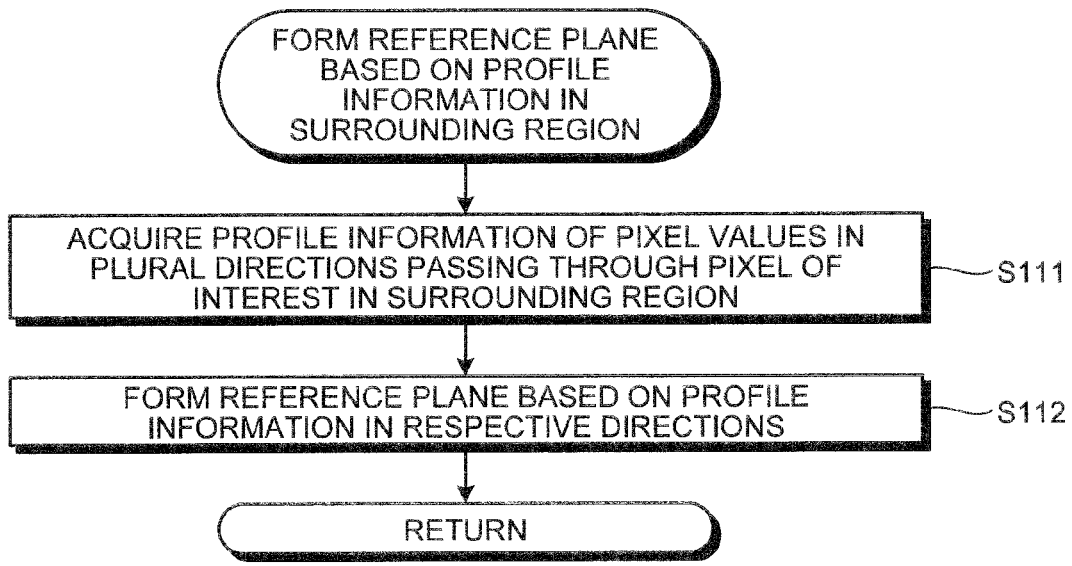
FIG. 4 is a flowchart illustrating specific operation of a reference plane forming unit.

In step S104, the reference plane forming unit 140 forms a reference plane based on profile information in the surrounding region. FIG. 4 is a flowchart illustrating a specific operation of the reference plane forming unit 140 in step S104.

Figure 5:
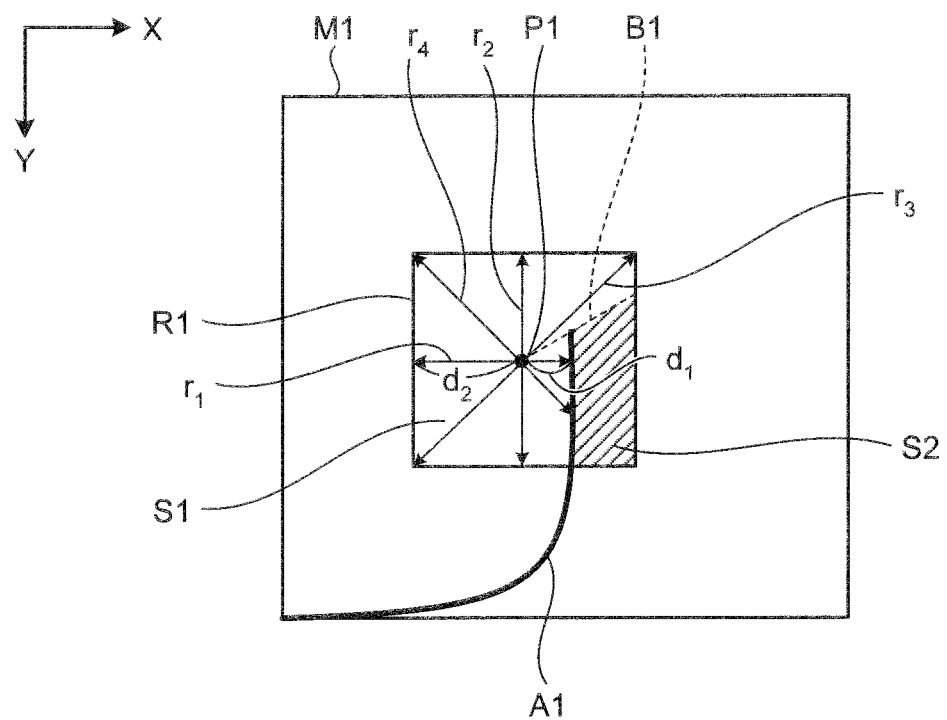
FIG. 5 is a schematic diagram exemplifying directions acquiring profile information upon formation of a reference plane.

First, in step S111, the reference plane forming unit 140 acquires profile information of pixel values in a plurality of directions passing through the pixel of interest in the surrounding region. In the first embodiment, the profile information in four directions ($r_1$ to $r_4$) including horizontal ($r_1$), vertical ($r_2$), and right and left oblique ($r_3$, $r_4$) directions passing through the pixel-of-interest position P1 as shown in FIG. 5. In the first embodiment, a value of R component having the highest spectral reflectivity among the respective color components of R, G, and B constituting an image is acquired as the profile information. Here, as the profile information, a value of G component having a wide bandwidth of a wavelength, and values of color change components acquired by dividing respective color components by distance information related to a distance, may be used as well as the value of R component. For example, the R component that has a high spectral reflectivity and that best reflects a distance from a subject may be used as the distance information, and then a value (G/R) acquired by dividing the G component by the R component may be used as a color change component.

In following step S112, the reference plane forming unit 140 forms a reference plane at the pixel-of-interest position based on the profile information in the respective directions. Specifically, the reference plane forming unit 140 firstly calculates, with respect to each of the four directions ($r_1$ to $r_4$), distances $d_1$ and $d_2$ between the pixel-of-interest position 21 and both ends of the region S1 determined as the surrounding region, and then performs the threshold value processing. In FIG. 5, distances $d_1$ and $d_2$ in the $r_1$ direction are illustrated. Then, when either of the directions $d_1$ or $d_2$ is not more than a predetermined threshold value, the direction is excluded from the target of forming a reference plane.

Next, the reference plane forming unit 140 calculates values of a reference plane at the pixel-of-interest position (coordinate ($x_0$, $y_0$)) expressed by the following equations (1-1) to (1-4) using the acquired profile information. Here, equation (1-1) is an equation for calculating a value of the reference plane PH($x_0$, $y_0$) based on the profile information in $r_1$ direction (X direction). Equation (1-2) is an equation for calculating a value of the reference plane PV($x_0$, $y_0$) based on the profile information in $r_2$ direction. Equation (1-3) is an equation for calculating a value of the reference plane PD1($x_0$, $y_0$) based on the profile information in $r_3$ direction. Equation (1-4) is an equation for calculating a value of the reference plane PD2($x_0$, $y_0$) based on the profile information in $r_4$ direction.

$$PH(x_0, y_0) = \left( \frac{P(x_0 + d_1, y_0) - P(x_0 - d_2, y_0)}{d_1 + d_2} d_2 + P(x_0 - d_2, y_0) \right) \quad (1\text{-}1)$$

$$PV(x_0, y_0) = \left( \frac{P(x_0, y_0 + d_1) - P(x_0, y_0 - d_2)}{d_1 + d_2} d_2 + P(x_0, y_0 - d_2) \right) \quad (1\text{-}2)$$

$$PD1(x_0, y_0) = \quad (1\text{-}3)$$
$$\left( \frac{P(x_0 + d_1', y_0 - d_1') - P(x_0 - d_2', y_0 + d_2')}{d_1 + d_2} d_2 + P(x_0 - d_2', y_0 + d_2') \right)$$

$$PD2(x_0, y_0) = \quad (1\text{-}4)$$
$$\left( \frac{P(x_0 + d_1', y_0 + d_1') - P(x_0 - d_2', y_0 - d_2')}{d_1 + d_2} d_2 + P(x_0 - d_2', y_0 - d_2') \right)$$

In equations (1-1) to (1-4), P(x, y) denotes the profile information (a value of an R component) of a pixel positioned at a coordinate (x, y). The values of $d_1'$ and $d_2'$ are given by the following equations (2-1) and (2-2).

$$d_1' = \frac{1}{\sqrt{2}} d_1 \quad (2\text{-}1)$$

$$d_2' = \frac{1}{\sqrt{2}} d_2 \quad (2\text{-}2)$$

The reference plane forming unit 140 records values PH($x_0$, $y_0$), PV($x_0$, $Y_0$), PD1($x_0$, $y_0$), and PD2($x_0$, $y_0$) that are calculated as described above in the recording unit 14 as values of the reference plane at the pixel-of-interest position P1.

Then, the operation returns to the main routine.

In step S105, the computing unit 100 judges if a reference plane is formed for the entire region other than the non-target region. If a reference plane is not yet formed for some region other than the non-target region (step S105: No), the computing unit 100 shifts the pixel-of-interest position (step S106). The shift may be performed by raster scan, for example. Thereafter, the operation moves to step S102.

On the other hand, if a reference plane has been formed for each of all pixels other than the non-target region (step S105: Yes), the outlier detecting unit 150 detects an outlier pixel having an outlier that is a pixel value numerically distant from its circumference based on a difference between corresponding quantities of the reference plane at each pixel position and of the original image (step S107).

Specifically, the outlier detecting unit 150 calculates: values PH, PV, PD1 and PD2 of the reference plane at a pixel position (x, y) based on profile information in the respective directions $r_1$ to $r_4$; and differences dPH, dPV, dPD1, dPD2 from a value of profile information P(x, y) at the pixel-of-interest position (x, y), according to the following equations (3-1) to (3-4).

$$dPH(x,y) = P(x,y) - PH(x,y) \quad (3\text{-}1)$$

$$dPV(x,y) = P(x,y) - PV(x,y) \quad (3\text{-}2)$$

$$dPD1(x,y) = P(x,y) - PD1(x,y) \quad (3\text{-}3)$$

$$dPD2(x,y) = P(x,y) - PD2(x,y) \quad (3\text{-}4)$$

Thereafter, the outlier detecting unit 150 calculates the minimum value among the respective differences dPH, dPV, dPD1, dPD2: d(x, y)=min(dPH(x, y), dPV(x, y), dPD1(x, y), dPD2(x, y)).

The outlier detecting unit 150 detects, as an outlier pixel, a pixel having such calculated minimum value of the differences larger than a predetermined threshold value.

In step S108, the computing unit 100 outputs the result of detecting an outlier pixel to the display unit 13 as an abnormal region. Specifically, a position of the outlier pixel is marked on the image, for example, and displayed on the display unit 13. In addition, the computing unit 100 records the result of detecting an outlier pixel in the recording unit 14. Thus, the operation of the image processing device 1 ends.

As described above, according to the first embodiment, when an outlier pixel is detected by referring to pixels surrounding the pixel of interest, only information of the surrounding region that should be actually referred to can be utilized, and thus it is possible to detect an abnormal region accurately.

Modified Example 1-1

Next, a modified example 1-1 of the first embodiment will be described.

In step S104, the reference plane forming unit 140 may form a reference plane by function approximation. Hereinafter, a specific method of forming a reference plane will be described.

First, the reference plane forming unit 140 calculates approximate curves that approximate profile information (values of R components, for example) of pixels in a surrounding region (region S1 in FIG. 3) in the respective directions $r_1$ to $r_4$. For example, a process for calculating coefficients a, b, and c is performed on a quadratic function expressed by the following equation (4) with respect to the direction $r_1$.

$$z(x)=ax^2+bx+c \qquad (4)$$

In equation (4), x is a coordinate value of a pixel in a surrounding region on the X axis, and z(x) is a value of profile information of the pixel.

The coefficients a, b, and c can be calculated using the following equation (5) by the method of least squares.

$$\begin{bmatrix} a \\ b \\ c \end{bmatrix} = (A^t \times A)^{-1} \times A^t \times \begin{bmatrix} z_1 \\ z_2 \\ \vdots \\ z_n \end{bmatrix} \qquad (5)$$

where $$A = \begin{bmatrix} x_1^2 & x_1 & 1 \\ x_2^2 & x_2 & 1 \\ \vdots & \vdots & \vdots \\ x_n^2 & x_n & 1 \end{bmatrix}$$

In equation (5), $x_i$ (i=1, 2, n) denotes coordinate values of pixels in the surrounding region, and $z_i$ denotes values of profile information of the coordinate $x_i$.

With respect to the directions $r_2$ to $r_4$, approximate curves are also calculated similarly by using distances between respective pixel coordinates and the pixel-of-interest position P1 instead of the variable x in the equation (4).

The reference plane forming unit 140 sets, as values of a reference plane, the values calculated by substituting the coordinate value of the pixel-of-interest position set in step S102 into the equations of the approximate curves calculated as described above.

In this case, the outlier detecting unit 150 calculates differences between the values of the reference plane at the pixel-of-interest position P1, which are calculated with respect to the respective directions $r_1$ to $r_4$, and profile information at the pixel-of-interest position P1, and detects an outlier pixel by comparing the minimum value of the differences with a threshold value.

Modified Example 1-2

Figure 6:
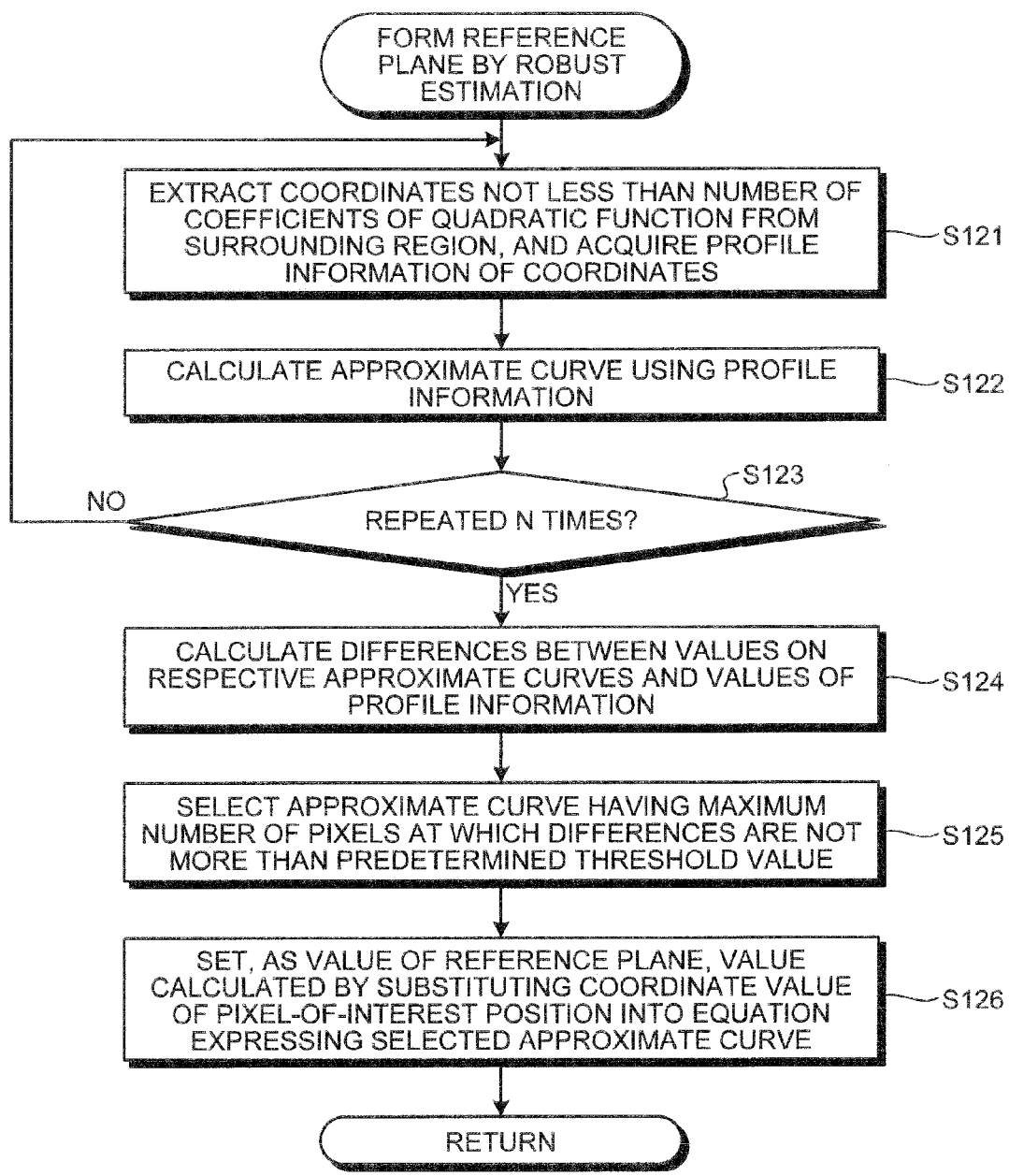
FIG. 6 is a flowchart illustrating an operation of the reference plane forming unit when a reference plane is formed by robust estimation.

In the modified example 1-1 described above, approximate curves of quadratic function are formed, but approximate curves may be formed by utilizing robust estimation in order to judge continuity in the circumference of a non-target region more accurately, and to improve accuracy of the approximate curve. FIG. 6 is a flowchart illustrating an operation of the reference plane forming unit 140 in a case where a reference plane is formed (step S104) by utilizing robust estimation.

First, in step S121, the reference plane forming unit 140 extracts coordinates not less than the number of coefficients of the quadratic function from the surrounding region determined in step S103, and also acquires profile information (pixel values) of the coordinates.

In following step S122, the reference plane forming unit 140 calculates an approximate curve by the method of least squares using the profile information.

The reference plane forming unit 140 forms N approximate curves by repeating these processes a predetermined times (N times) while changing coordinate at which profile information is to be acquired (step S123: No).

If calculation of an approximate curve has been performed N times (step S123: Yes), the reference plane forming unit 140 calculates differences between the values on the respective approximate curves and the profile information corresponding thereto (step S124).

In step S125, the reference plane forming unit 140 acquires the number of pixels at which differences calculated in step S124 are not more than a predetermined threshold value with respect to the respective approximate curves, and selects an approximate curve having the maximum number of pixels. Here, the number of pixels corresponds to a region where values on the approximate curve are almost identical to the profile information (identical region).

In step S126, the reference plane forming unit 140 sets, as a value of a reference plane, a value calculated by substituting the coordinate value of the pixel-of-interest position into the equation expressing the selected approximate curve.

Then, the operation returns to the main routine.

As described above, according to the modified example 1-2, data used for forming an approximate curve is acquired randomly, and thus an influence of data around a non-target region on a formed approximate curve can be suppressed. Therefore, it is possible to judge continuity around a non-target region more accurately, and to improve the accuracy of an approximate curve.

Second Embodiment

Next, a second embodiment of the invention will be described.

A configuration and an operation of an image processing device according to the second embodiment as a whole are similar to those illustrated in FIGS. 1 and 2, and a specific operation of the surrounding region determining unit 130 in step S103 and a specific operation of the reference plane forming unit 140 in step S104 are the only differences from the first embodiment. Hereinafter, operations of the surrounding region determining unit 130 and the reference plane forming unit 140 according to this second embodiment will be described.

In step S103, the surrounding region determining unit 130 determines a surrounding region based on a pixel-of-interest position and a non-target region. Specifically, in a case illustrated in FIG. 3, a first area (region S1) that is an area including the pixel-of-interest position P1 and not exceeding the non-target region A1 in the pixel-of-interest region, and a second area (region S2) excluding the first area and the non-target region A1 are determined as the surrounding region.

In step S104, the reference plane forming unit 140 forms a reference plane based on profile information in the surrounding region. At this time, in the second embodiment, a reference plane is formed by performing morphological operations (an opening operation or a closing operation) on the region S1 and the region S2 respectively.

Here, the morphological opening operation is a process of acquiring a trajectory of the maximum value of the outer periphery of a basic graphic called a structuring element when the structuring element is moved while circumscribed to the profile information from a side on which the profile information is smaller. And, the morphological closing operation is a process of acquiring a trajectory of the minimum value of the outer periphery of the structuring element when the structuring element is moved while circumscribed to the profile information from a side on which the profile information is larger (reference: KOBATAKE Hidefumi, *Morphology*, CORONA PUBLISHING CO, LTD).

More specifically, the reference plane forming unit 140 locates the center of a structuring element of the same size with the pixel-of-interest region R1 (the diameter thereof is the same as the one side of the pixel-of-interest region R1, for example) at every pixel position in the pixel-of-interest region R1, and then performs the opening or closing process. Circumscribed surfaces of the structuring elements thus acquired are compared, and then a surface of the maximum value and the minimum value are used as a reference plane respectively for the closing operation and for the opening operation.

Here, the reason of forming a reference plane by performing morphological operations with respect to the first area and the second area as surrounding regions respectively will be described with reference to FIGS. 7 to 8B.

Figure 7:
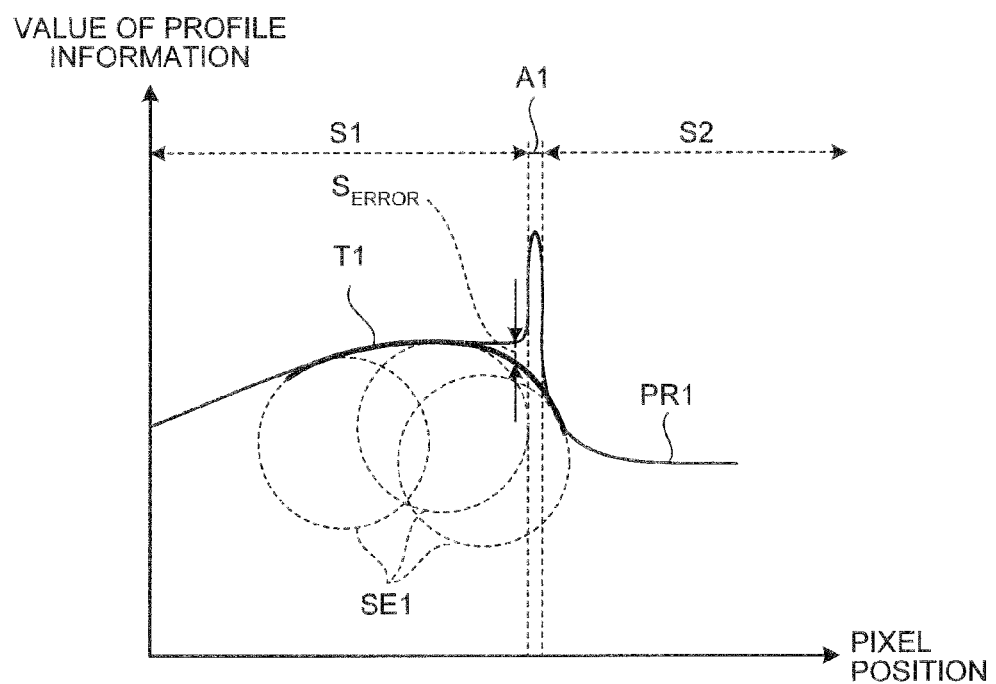
FIG. 7 is a diagram explaining formation of a reference plane by morphological operations.

FIG. 7 is a schematic diagram illustrating an example where the morphological opening operation is performed on a profile PR1 over the regions S1 and S2. As illustrated in FIG. 7, when the process of circumscribing the structuring element SE1 to the profile PR1 is performed from the side of the region S1, for example, this process moves to the region S2 skipping the non-target region A1 that is a region narrower than the structuring element SE1. Therefore, a trajectory T1 acquired by this process links the profile PR1 in the region S1 and the profile PR1 in the region S2 gently. Consequently, the trajectory T1 loses touch with the profile PR1 around the non-target region A1 ($S_{ERROR}$). Therefore, if the trajectory T1 as described above is used as a reference plane, the detection accuracy of an abnormal region decreases.

Figure 8A:
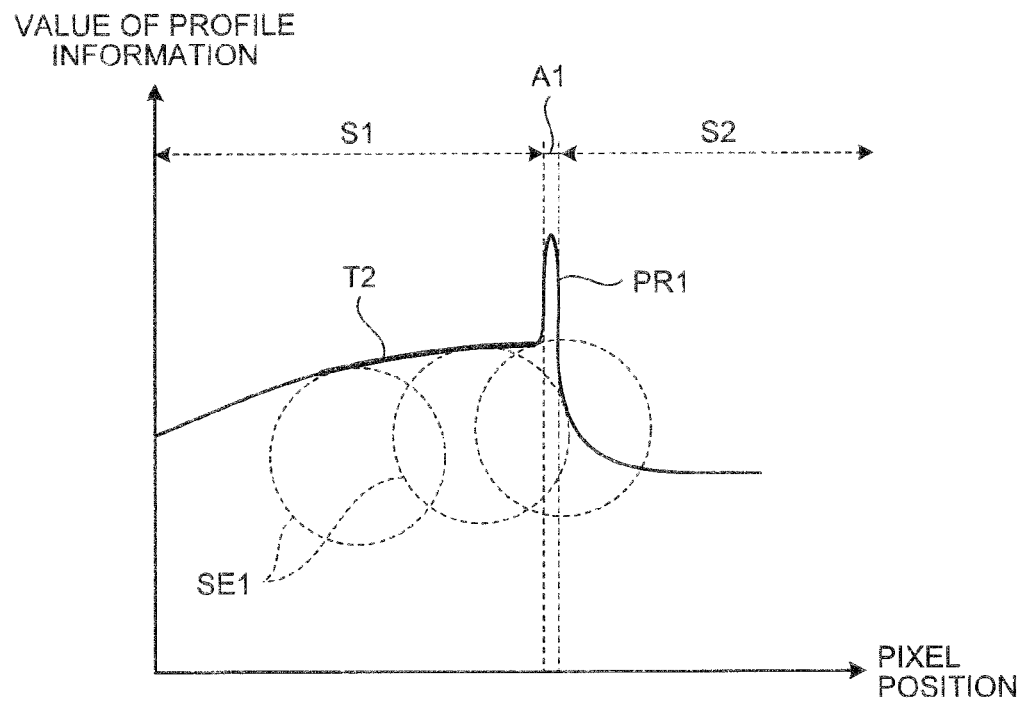
FIG. 8A is a diagram explaining formation of a reference plane by morphological operations.
Figure 8B:
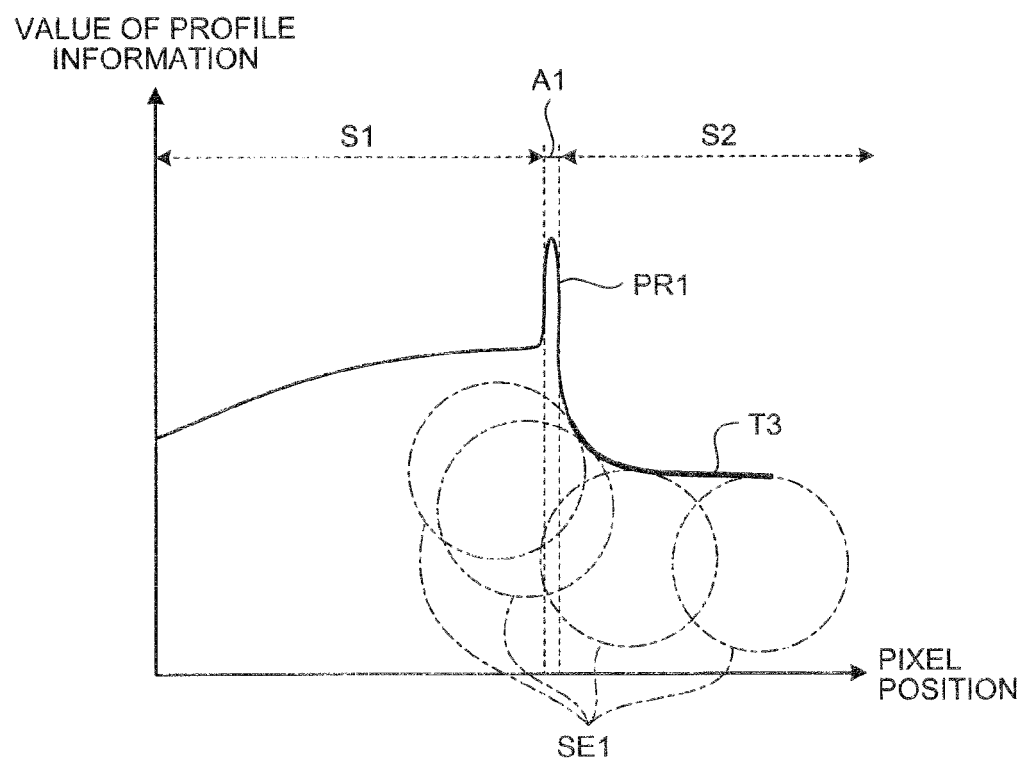
FIG. 8B is a diagram explaining formation of a reference plane by morphological operations.

On the other hand, FIGS. 8A and 8B are schematic diagrams illustrating an example of performing morphological opening operations on the profile PR1 in the region S1 and the region S2 respectively. FIG. 8A illustrates a processing result in the region S1, and FIG. 8B illustrates a processing result in the region S2. As illustrated in FIG. 8A, a process of circumscribing the structuring element SE1 to the profile PR1 is not affected by the region S2 even around the end of the region S1. Therefore, a trajectory T2 as a resultant of this process has a form along the profile PR1 even around the boundary between the region S1 and the non-target region A1. Also in FIG. 8B, a process of circumscribing the structuring element SE1 to the profile PR1 is not affected by the region S1 even around the end of the region S2 similarly. Therefore, a trajectory T3 as a resultant of this process has a form along the profile PR1 even around the boundary between the profile region S2 and the non-target region A1. Consequently, the use of the trajectories T2 and T3 acquired as described above as a reference plane enables to improve the detection accuracy of an abnormal region.

As described above, according to the second embodiment, when an outlier pixel is detected by referring to pixels surrounding the pixel of interest, only information of the surrounding region that should be actually referred to can be utilized, and thus it is possible to detect an abnormal region accurately. In addition, in the second embodiment, the profile information of the all region except for the non-target region is used to increase the number of samples for forming a reference plane, thereby enabling the formation of a reference plane on which information of a wider area is reflected.

In the second embodiment, with respect to one pixel-of-interest region that is set, a reference plane can be formed not only for the pixel-of-interest position, but for a region having some extent including the pixel-of-interest position. Therefore, when the pixel-of-interest position is shifted (step S106 in FIG. 2), adjacent pixels of interest can have a gap therebetween as long as a gap is not generated between the pixel-of-interest regions.

In addition, in the second embodiment, a reference plane may be formed using the profile information in the regions S1 and S2 in the pixel-of-interest region R1 in a way similar to the first embodiment, and the modified examples 1-1 and 1-2. Also in this case, the number samples for forming a reference plane is increased, thereby enabling the formation of a reference plane on which information of a wider area is reflected.

Third Embodiment

Next, a third embodiment of the invention will be described.

Figure 9:
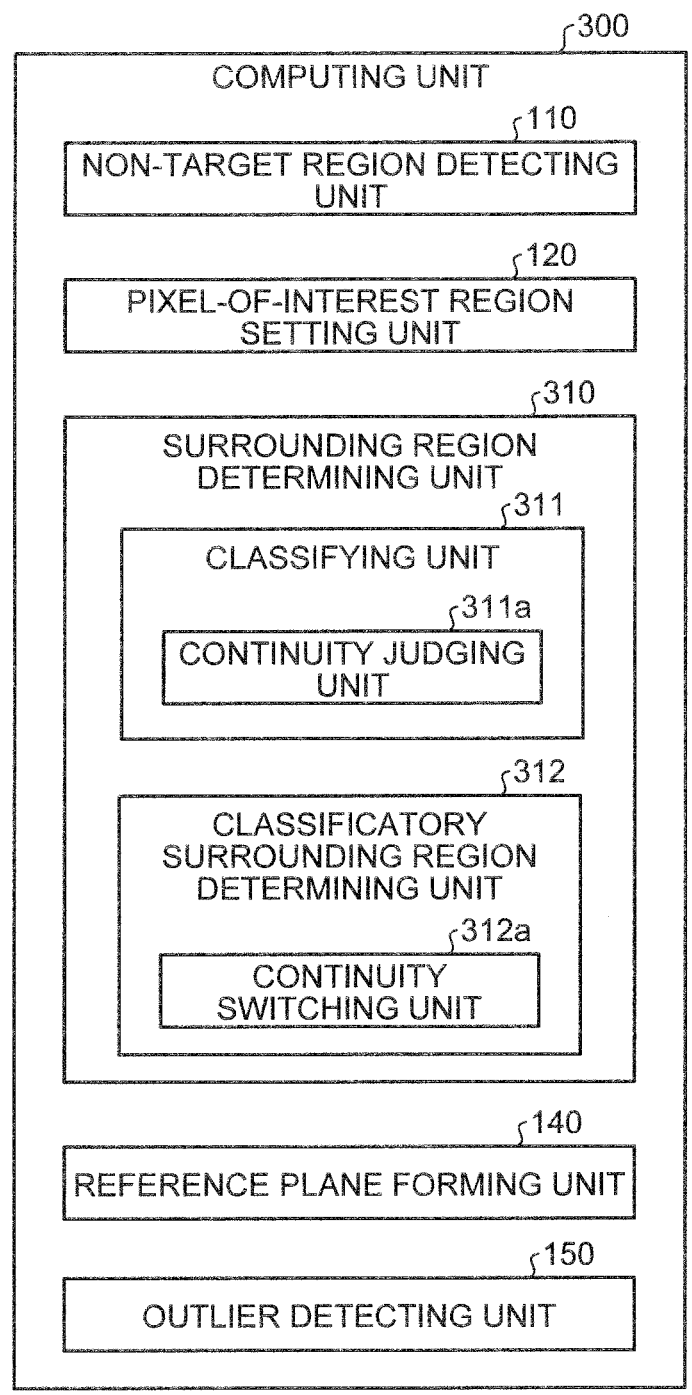
FIG. 9 is a block diagram illustrating a configuration of a computing unit of an image processing device according to a third embodiment.

FIG. 9 is a block diagram illustrating a configuration of a computing unit provided in an image processing device according to the third embodiment. A configuration of the image processing device according to the third embodiment except for a computing unit is similar to FIG. 1.

As illustrated in FIG. 9, a computing unit 300 includes, instead of the surrounding region determining unit 130 illustrated in FIG. 1, a surrounding region determining unit 310 that determines a surrounding region with respect to a pixel-of-interest region depending on a classification of a non-target region.

More specifically, the surrounding region determining unit 310 has a classifying unit 311 for classifying a non-target region, and a classificatory surrounding region determining unit 312 for determining a surrounding region depending on the classification of the non-target region. The classifying unit 311 includes a continuity judging unit 311a that judges continuity of a non-target region and its circumferential region, and classifies a non-target region into a non-target region having continuity with the circumference and a non-target region not having continuity with the circumference based on this continuity. In addition, the classificatory surrounding region determining unit 312 includes a continuity switching unit 312a that switches a method of determining a surrounding region depending on the presence or absence of the continuity, and determines a surrounding region by a method that is set depending on the continuity of the non-target region.

Figure 10:
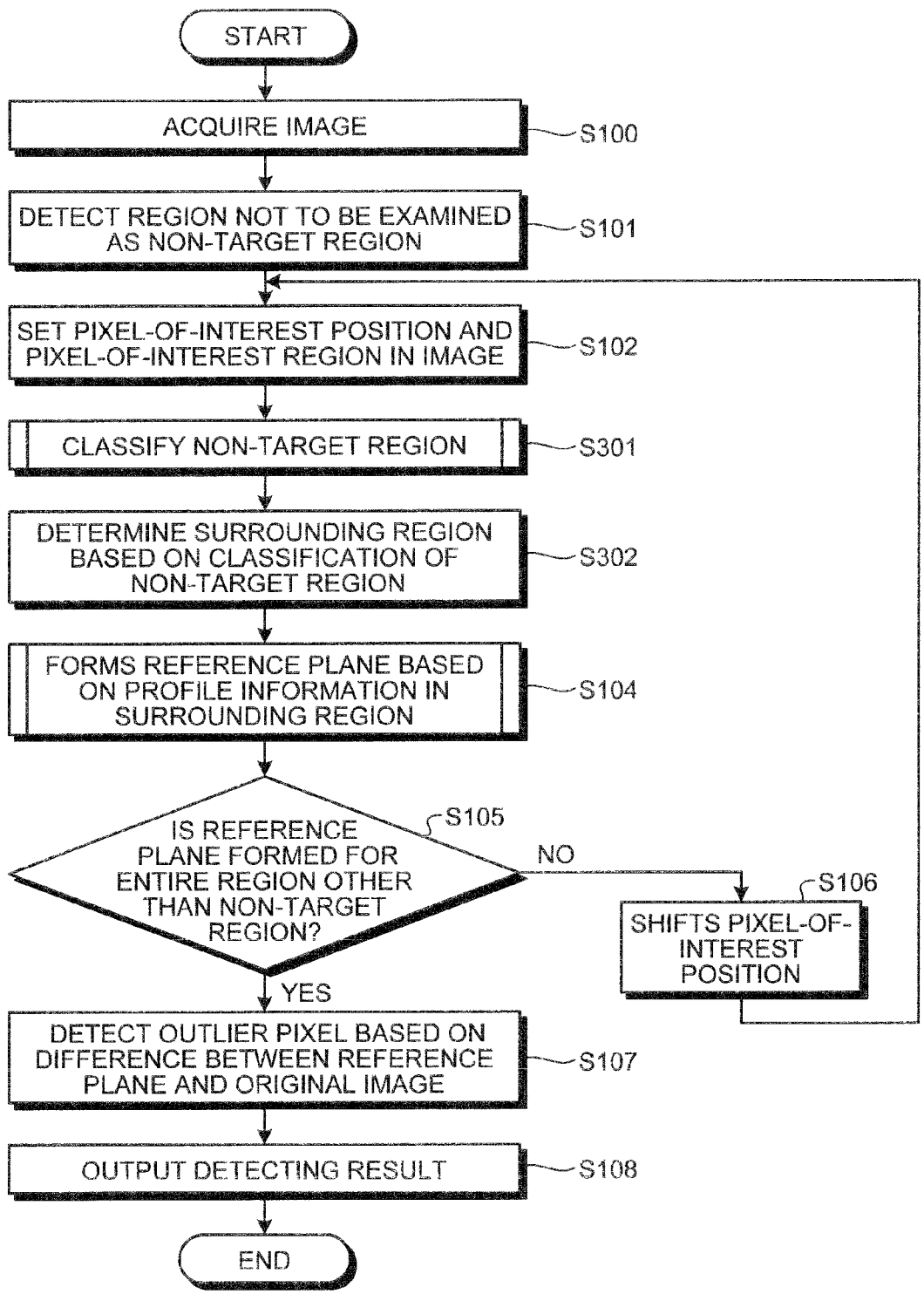
FIG. 10 is a flowchart illustrating an operation of the image processing device according to the third embodiment.

Next, an operation of the image processing device according to the third embodiment will be described. FIG. 10 is a flowchart illustrating an operation of the image processing device as a whole according to the third embodiment. In the operation, steps S100 to S102 and S104 to S108 are similar to the first embodiment.

Figure 11:
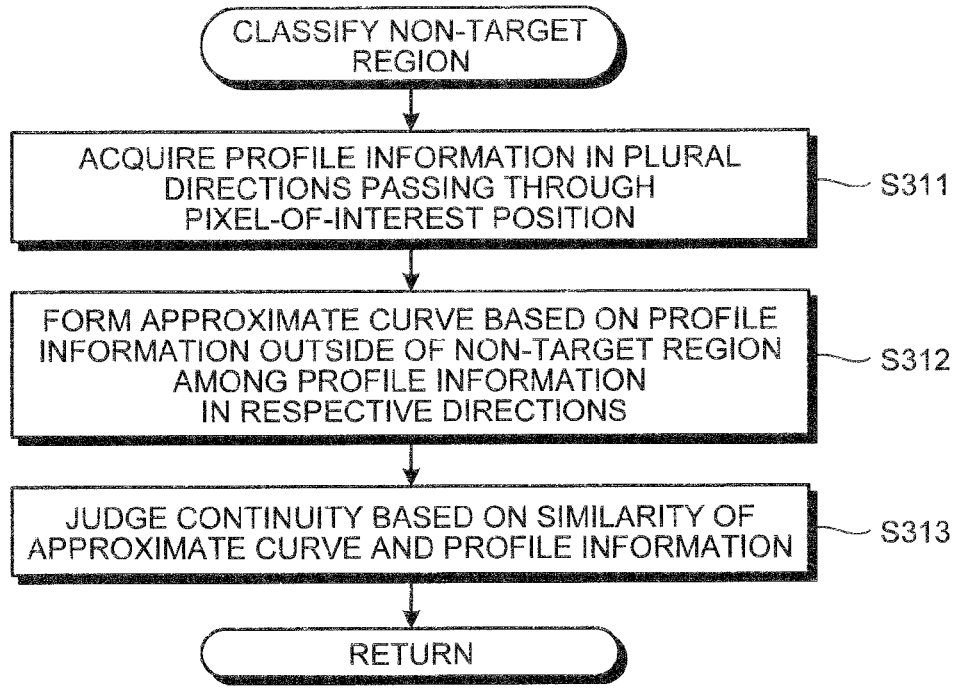
FIG. 11 is a flowchart illustrating a specific operation of a surrounding region determining unit according to the third embodiment.

In step S301 following step S102, the classifying unit 311 classifies a non-target region in a pixel-of-interest region. FIG. 11 is a flowchart illustrating a specific operation of the classifying unit 311 in step S301.

Figure 12:
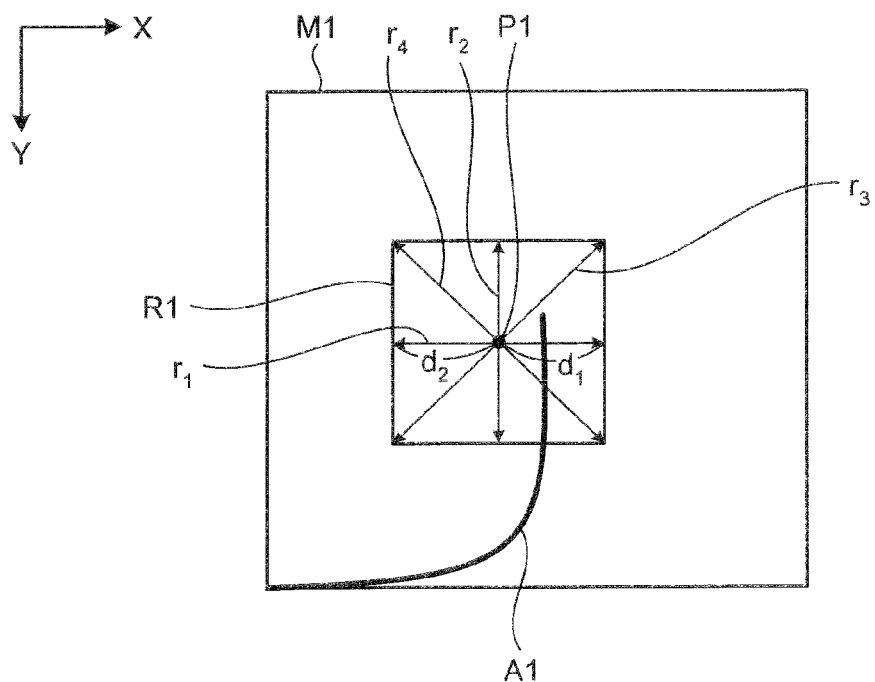
FIG. 12 is a schematic diagram exemplifying directions in which profile information is acquired upon judging continuity.

First, in step S311, the continuity judging unit 311a acquires profile information in a plurality of directions passing through the pixel-of-interest position in the pixel-of-interest region. More specifically, the continuity judging unit 311a acquires profile information in four directions including vertical, horizontal, and oblique directions ($r_1$ to $r_4$) passing through the pixel-of-interest position P1 in the pixel-of-interest region R1 as illustrated in FIG. 12. As the profile information, a value of an R component having the highest spectral reflectivity among the color components of R, G, and B constituting an image, a value of G component having a wide bandwidth of a wavelength, and values of color change components acquired by dividing respective color components by distance information may be used. In the third embodiment, the R component that has a high spectral reflectivity and that best reflects a distance from a subject is used as the distance information, and a value of a color change component (G/R) acquired by dividing the G component by the R component is used as the profile information.

In following step S312, the continuity judging unit 311a forms an approximate curve based on profile information of a region positioned outside of the non-target region A1 inside the pixel-of-interest region R1 among the profile information in the respective directions $r_1$ to $r_4$. Here, a method of forming the approximate curve is similar to that described in the modified example 1-1 of the first embodiment.

In step S313, the continuity judging unit 311a judges the continuity between a discontinuity region and its circumferential region based on similarity of the approximate curve and the profile information. Specifically, the continuity judging unit 311a calculates differences between values on the approximate curve in the respective directions $r_1$ to $r_4$ and the profile information corresponding thereto, and acquires the number of pixels having the differences not more than a predetermined threshold value. Here, this number of pixels corresponds to a region where values on the approximate curve and the profile information are almost identical (identical region). In addition, the continuity judging unit 311a judges the non-target region to be a discontinuity region when this number of pixels is less than a predetermined threshold value (or not more than the threshold value), and judges the non-target region to be a continuity region when the number of pixels is not less than the predetermined threshold value (or more than the threshold value).

Then, the operation returns to the main routine.

In step S302, the classificatory surrounding region determining unit 312 determines the surrounding region used for the formation of a reference plane based on the classification of the non-target region. More specifically, if the non-target region is judged to be a discontinuity region in step S301, the continuity switching unit 312a determines, as the surrounding region, an area in the pixel-of-interest region that does not exceed the non-target region when viewed from the pixel-of-interest position (i.e. the region S1). On the other hand, if the non-target region is judged to be a continuity region in step S301, an area in the pixel-of-interest region R1 except for the non-target region A1 (i.e. regions S1 and S2) are determined as the surrounding region.

Thereafter, the operation moves to step S104.

As described above, according to the third embodiment, the surrounding region used for the formation of a reference plane is determined depending on the continuity between the non-target region and its circumference, and thus the accuracy of the reference plane can be improved and excess detection of an abnormal region can be suppressed.

Modified Example 3-1

Next, a modified example 3-1 of the third embodiment will be described.

Figure 13:
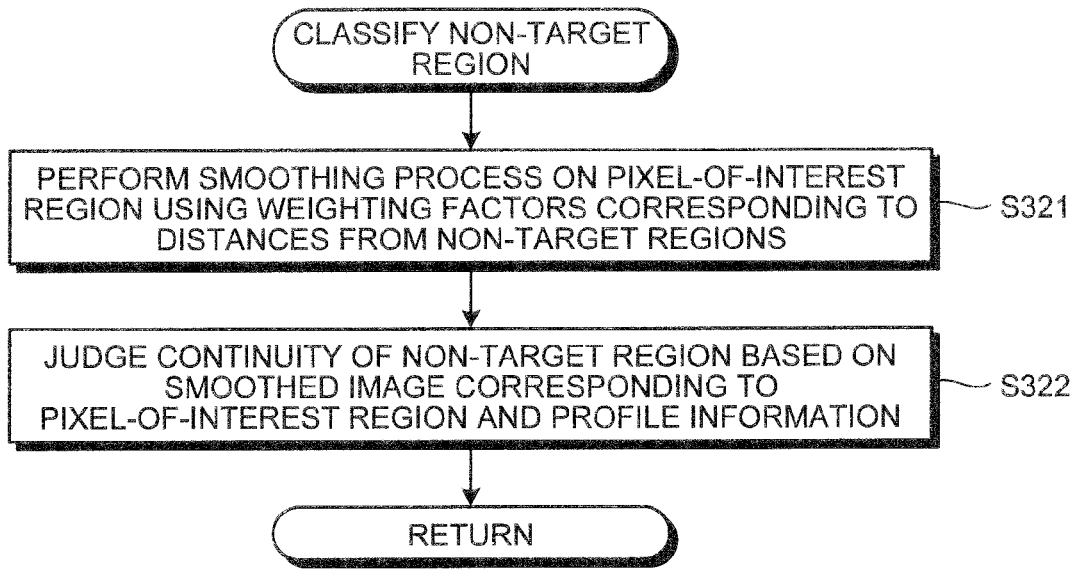
FIG. 13 is a flowchart illustrating a method of classifying a non-target region according to a modified example 3-1.

In step S301, instead of forming an approximate curve, a non-target region may be classified by a smoothing process. Hereinafter, a method of classifying a non-target region by the smoothing process will be described. FIG. 13 is a flowchart illustrating a method of classifying a non-target region according to the modified example 3-1.

Figure 14:
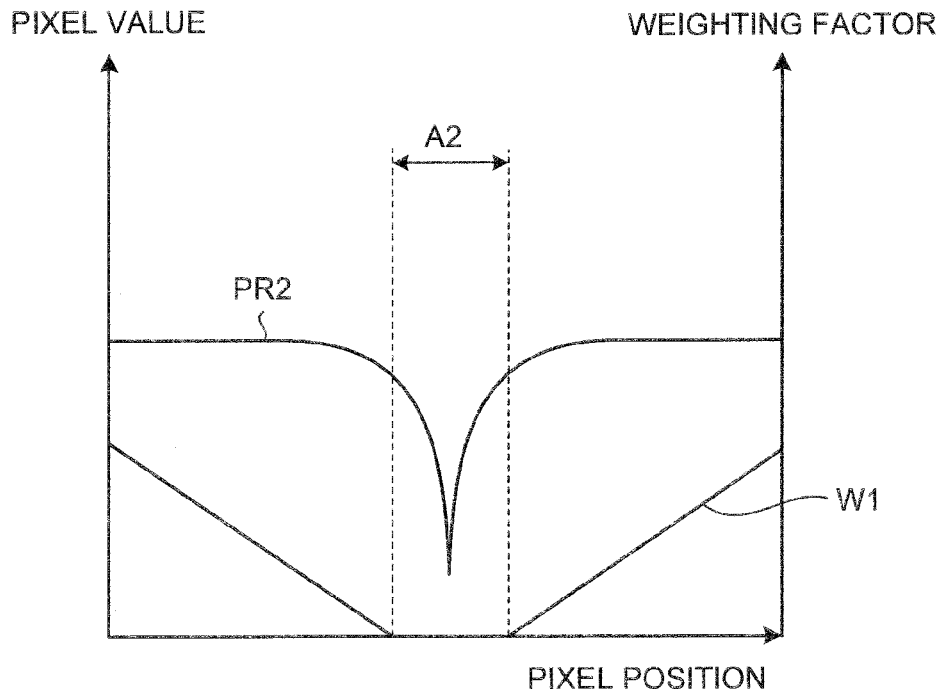
FIG. 14 is a schematic diagram explaining a method of setting weighting factors in a weighted smoothing process.

In step S321, the continuity judging unit 311a performs the smoothing process on the pixel-of-interest region using weighting factors corresponding to distances from the non-target regions. When a non-target region A2 is detected in the pixel-of-interest region constituted of pixels having pixel values PR2 as illustrated in FIG. 14, the continuity judging unit 311a sets weighting factors W1 increasing proportionally to a coordinate distance from the non-target region to respective pixels in the pixel-of-interest region, for example. At this time, the values of the weighting factors are set to zero inside the non-target region. Then, these weighting factors W1 are multiplied with factors of Gaussian filter, for example to form a filter, and using the filter, a smoothing process is performed on the respective pixels in the pixel-of-interest region.

In following step S322, the continuity judging unit 311a judges the continuity of the non-target region based on a smoothed image corresponding to the pixel-of-interest region and the profile information. Specifically, the continuity judging unit 311a acquires the profile information (values of color change component G/R) in a plurality of directions (directions $r_1$ to $r_4$ illustrated in FIG. 12) passing through the pixel-of-interest position in the pixel-of-interest region. Then, differences of the G/R values, for example, are calculated in the smoothed image and the profile information in the respective directions $r_1$ to $r_4$. Thereafter, the continuity judging unit 311a detects outlier regions having differences larger than a predetermined threshold value and acquires a width in which the outer regions continue in the respective directions $r_1$ to $r_4$. The continuity judging unit 311a judges that the non-target region is a continuity region of its circumferential region if the width is less than (or not more than) a predetermined threshold value. On the other hand, the non-target region is determined as a discontinuity region of its circumferential region if the width is not less than the predetermined threshold value (or more than the predetermined threshold value).

Modified Example 3-2

Next, a modified example 3-2 of the third embodiment will be described.

Figure 15:
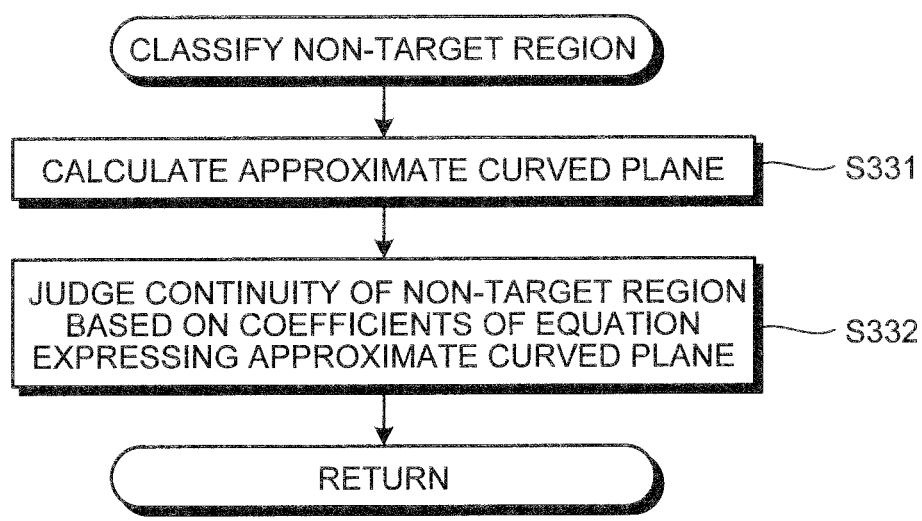
FIG. 15 is a flowchart illustrating a method of classifying a non-target region according to a modified example 3-2.

In step S301, a non-target region may be classified using coefficients of an approximate plane. Hereinafter, a method of classifying a non-target region based on coefficients of an approximate plane will be described. FIG. 15 is a flowchart illustrating a method of classifying a non-target region in the modified example 3-2.

In step S331, the continuity judging unit 311a calculates an approximate plane that approximates pixel values of pixels in the pixel-of-interest region. More specifically, with respect to a quadratic function expressed by the following equation (6), coefficients a to f are calculated by the following equation (7).

$$z(x, y) = ax^2 + by^2 + cxy + dx + ey + f \quad (6)$$

$$\begin{bmatrix} a \\ b \\ c \\ d \\ e \\ f \end{bmatrix} = (C^t \times C)^{-1} \times C^t \times \begin{bmatrix} z_1 \\ z_2 \\ \vdots \\ z_n \end{bmatrix} \quad (7)$$

where, $$C = \begin{bmatrix} x_1^2 & y_1^2 & x_1 y_1 & x_1 & y_1 & 1 \\ x_2^2 & y_2^2 & x_2 y_2 & x_2 & y_2 & 1 \\ \vdots & \vdots & \vdots & \vdots & \vdots & \vdots \\ x_n^2 & y_n^2 & x_n y_n & x_n & y_n & 1 \end{bmatrix}$$

Alternatively, approximate curves expressed by equation (4) or the like may be calculated in respective directions $r_1$ to $r_4$ similarly to the modified example 1-1

In following step S332, the continuity judging unit 311a judges the continuity of the non-target region based on the coefficients of the equation expressing the approximate plane. Specifically, if the turning point of the quadratic function exists in a non-target region, and an absolute value of the second degree coefficient of the quadratic function (|a| and |b| for equation (6) and |a| for equation (4)) is not less than a predetermined threshold value, the non-target region is judged as a discontinuity region. On the other hand, if the turning point is not included in the non-target region, or the absolute value of the second degree coefficient of the quadratic function is less than the predetermined threshold value, the non-target region is judged as a continuity region. In the case of equation (6), the turning point in X direction is given by $\{(-cy+d)/(2a)\}$, and the turning point in Y direction is given by $\{-(cx+e)/(2b)\}$, respectively. In the case of equation (4), the turning point is given by $(-b/2a)$.

Figure 16A:
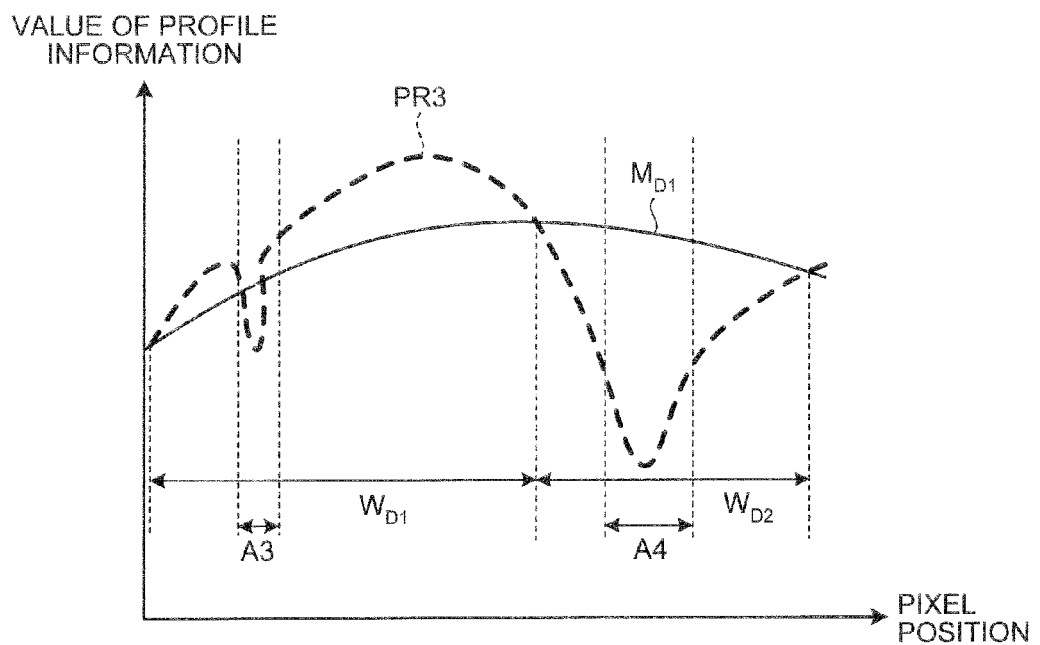
FIG. 16A is a schematic diagram explaining a method of judging continuity of a non-target region based on factors of an equation expressing an approximate curve.
Figure 16B:
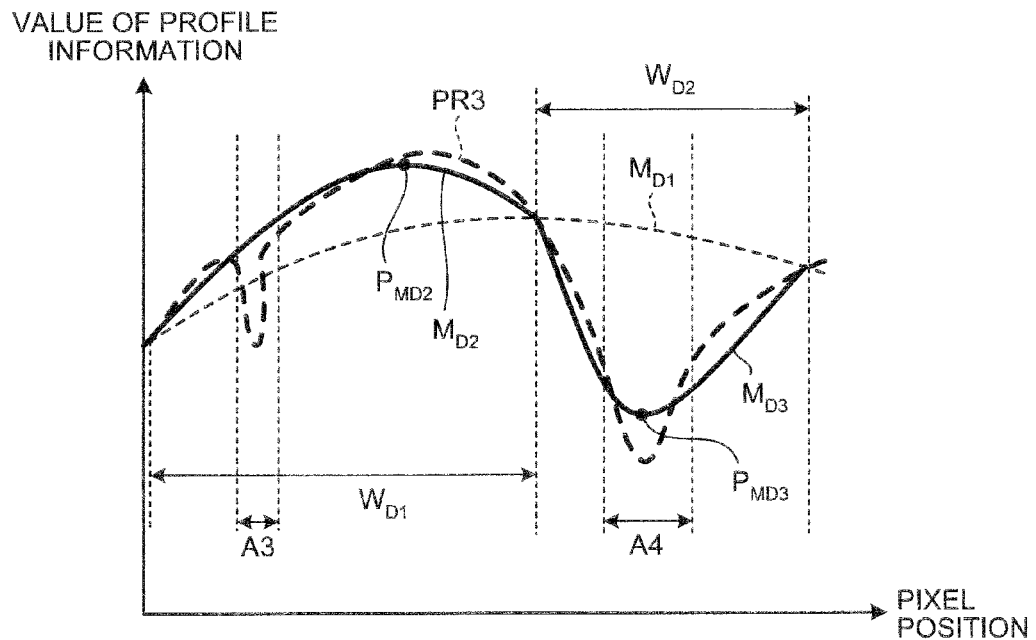
FIG. 16B is a schematic diagram explaining a method of judging continuity of a non-target region based on a factor of an equation expressing an approximate curve.

FIG. 16A is a schematic diagram illustrating a first calculation result of an approximate plane with respect to a profile PR3 in a certain pixel-of-interest region. Here, FIG. 16A and FIG. 16B to be described later illustrate approximate planes in one direction one dimensionally. An approximate plane $M_{D1}$ illustrated in FIG. 16A is calculated based on profile information of regions other than non-target regions A3 and A4. For the first calculation result as described, a second calculation of an approximate plane is performed for respective regions $W_{D1}$ and $W_{D2}$ that are obtained by dividing at a position where the profile PR3 out of the non-target regions A3 and A4 and the approximate plane $M_{D1}$ intersect with each other. FIG. 16B is a schematic diagram illustrating a second calculation result of an approximate plane. In this case, the continuity with a circumferential region of the non-target regions A3 and A4 is judged as follows. For example, in the case of the non-target region A3, a local maximum point $P_{MD2}$ of an approximate plane $M_{D2}$ formed for the region $W_{D1}$ including the non-target region A3 exists outside the non-target region A3. In such a case, the non-target region A3 is judged to be continuous with its circumferential region. On the other hand, in the case of the non-target region A4, a local minimum point $P_{MD3}$ of an approximate plane $M_{D3}$ formed for the region $W_{D2}$ including the non-target region A4 exists in the non-target region A4. In this case, if an absolute value of the second degree coefficient of the approximate plane $M_{D3}$ is not less than the predetermined threshold value, the non-target region A4 is judged to be discontinuous with its circumferential region.

Modified Example 3-3

Next, a modified example 3-3 of the third embodiment will be described.

Figure 17:
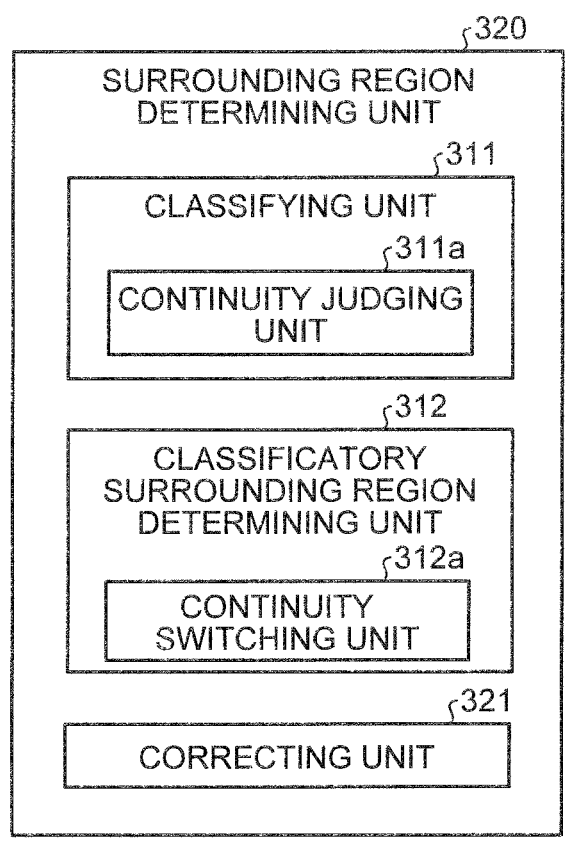
FIG. 17 is a block diagram illustrating a configuration of a surrounding region determining unit according to a modified example 3-3.

FIG. 17 is a block diagram illustrating c configuration of the surrounding region determining unit in the modified example 3-3. The image processing device according to the modified example 3-3 includes a surrounding region determining unit 320 illustrated in FIG. 17 instead of the surrounding region determining unit 310 illustrated in FIG. 9. The surrounding region determining unit 320 has a correcting unit 321 for correcting profile information in a non-target region using profile information in a circumferential region of the non-target region, in addition to the classifying unit 311 and the classificatory surrounding region determining unit 312.

The correcting unit 321 corrects the non-target region when the classifying unit 311 judges that the non-target region is a continuity region with its circumferential region. Specifically, the non-target region is interpolated with an average value of profile information of the circumferential region of the non-target region. Alternatively, the non-target region may be interpolated by performing a weighted smoothing process using the profile information of the circumferential region of the non-target region and weighting factors similarly as described in the modified example 3-1. In addition, the non-target region may be interpolated by performing a function approximation process using the profile information of the circumferential region of the non-target region in a way similar to that described in the modified example 3-2.

In this case, the surrounding region determining unit 320 can set the whole pixel-of-interest region including the interpolated non-target region as a surrounding region used for the formation of a reference plane.

Fourth Embodiment

Next, a fourth embodiment according to the invention will be described.

Figure 18:
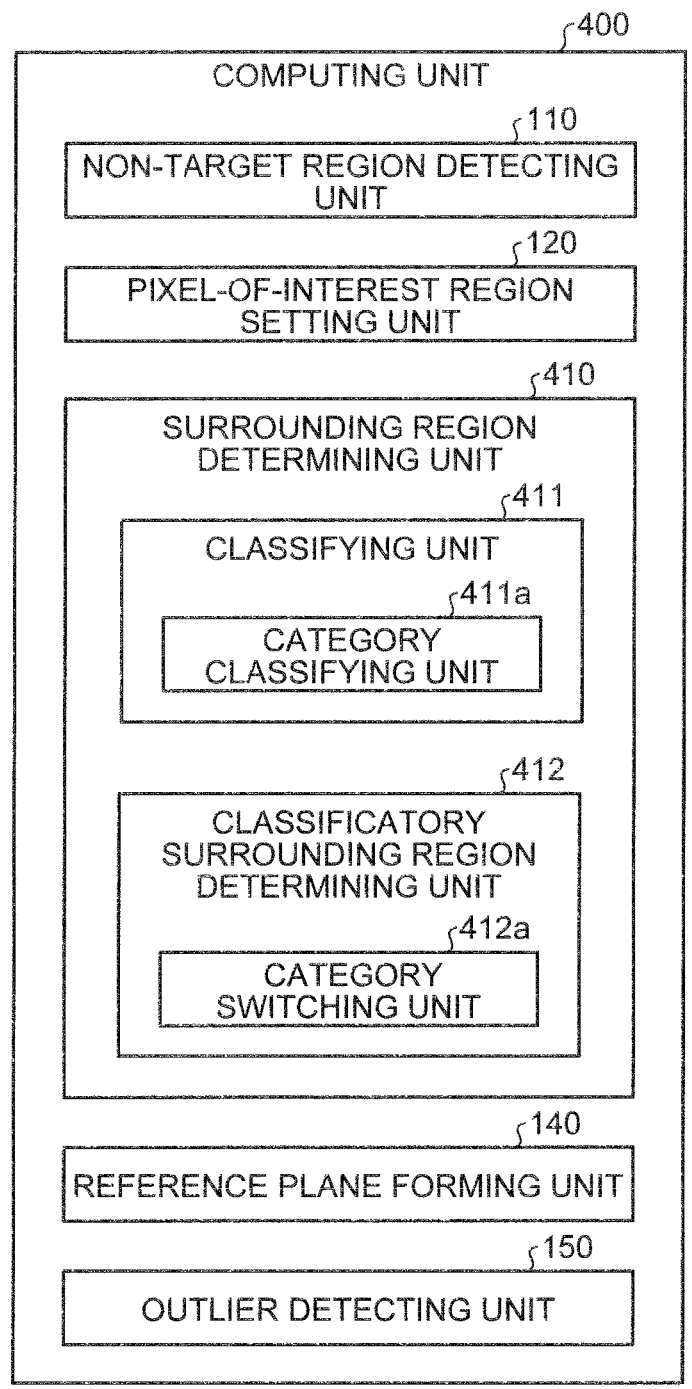
FIG. 18 is a block diagram illustrating a configuration of a computing unit of an image processing device according to a fourth embodiment.

FIG. 18 is a block diagram illustrating a configuration of a computing unit provided in an image processing device according to the fourth embodiment. A configuration of the image processing device according to the fourth embodiment except for the computing unit is similar to FIG. 9.

As illustrated in FIG. 18, a computing unit 400 includes, instead of the surrounding region determining unit 310 illustrated in FIG. 9, a surrounding region determining unit 410 that determines a surrounding region with respect to a pixel-of-interest region depending on a classification of a non-target region.

More specifically, the surrounding region determining unit 410 has a classifying unit 411 for classifying a non-target region, and a classificatory surrounding region determining unit 412 for determining a surrounding region depending on the classification of the non-target region.

The classifying unit 411 includes a category classifying unit 411a that classifies a non-target region into a plurality of categories depending on a detecting method of the non-target region, and classifies non-target region into the categories such as shadow, halation, groove, blood vessel, and bubble. The categories may include at least one of these categories, and it is assumed that all categories are included in the following description.

On the other hand, the classificatory surrounding region determining unit 412 includes a category switching unit 412a that switches a method of determining a surrounding region depending on the categories of the non-target region, and determines a surrounding region by a method that is set depending on the categories of the non target region.

Next, an operation of the image processing device according to the fourth embodiment will be described. The operation of the image processing device according to the fourth embodiment as a whole is similar to that of the third embodiment, but only a specific operation of the surrounding region determining unit 410 in step S301 and step S302 is different to the third embodiment. Hereinafter, the operation of the surrounding region determining unit 410 according to the fourth embodiment will be described.

In step S301 following step S102, the classifying unit 411 classifies a non-target region in a pixel-of-interest region. More specifically, the category classifying unit 411a detects a non-target region similarly to the first embodiment, and at this time, label information depending on the detecting methods (1) to (4) described in the first embodiment is provided to each of the pixels in the detected non-target region. Here, the label information for each of the detecting methods may be provided by the non-target region detecting unit 110 in step S101.

In addition, the category classifying unit 411a classifies the non-target region into categories such as shadow, halation, groove, residue, bubble, blood vessel based on the label information provided to each of the pixels.

In step S302, the classificatory surrounding region determining unit 412 determines a surrounding region used for the formation of a reference plane based on the classification of the non-target region. More specifically, the category switching unit 412a determines a surrounding region depending on the category of the non-target region.

Specifically, the category switching unit 412a determines, as the surrounding region, an area in the pixel-of-interest region that does not exceed the non-target region when viewed from the pixel-of-interest position (the region S1 illustrated in FIG. 5, for example) if the category of the non-target region is shadow, groove, or residue. This is because a non-target region such as a shadow, a groove, and a residue does not show continuity with their adjacent target regions.

On the other hand, the category switching unit 412a determines, as the surrounding region, an area excluding the non-target region in the pixel-of-interest region if the category of the non-target region is bubble, blood vessel, or halation (a region excluding the non-target region A1 illustrated in FIG. 12, for example). This is because a non-target region such as a bubble, a blood vessel, and a halation shows continuity with their adjacent target regions.

In this case, the surrounding region determining unit 410 may be further provided with a correcting unit similar to the modified example 3-3, and may correct the profile information of a non-target region classified into bubble, blood vessel, or halation. Specifically, profile information in the non-target region is interpolated using an average value of profile information in a circumferential region of the non-target region, by weighted smoothing process, by function approximation process, or the like. In this case, the whole pixel-of-interest region including the interpolated non-target region may be set as a surrounding region used for the formation of a reference plane.

As described above, according to the fourth embodiment, when an outlier pixel is detected by referring to pixels surrounding the pixel of interest, only information of the surrounding region that should be actually referred to can be utilized, and thus it is possible to detect an abnormal region accurately.

In addition, according to the fourth embodiment, an area of the surrounding region is determined depending on the category of the non-target region, and thus the accuracy of the formation of a reference plane can be improved and excess detection of an abnormal region can be suppressed.

According to the first to fourth embodiments and the modified examples described above, a surrounding region that is an area for acquiring information used for the formation of a reference plane with respect to a pixel-of-interest region is determined based on a non-target region detected from an image, and thus it is possible to set a surrounding region that should be actually referred to, and it is possible to improve accuracy of detecting outlier pixels. Therefore, an abnormal region that is a lesion candidate region can be detected accurately from an image.

The image processing devices according to the first to fourth embodiments and the modified examples can be realized by running an image processing program recorded in a recording medium on a personal computer or a computer system such as a work station. In addition, such a computer system can be used while it is connected to another computer system or a device such as a server, via a local area network (LAN), a wide area network (WAN), or a public circuit such as the Internet. In this case, the image processing device according to the first to third embodiments and the modified examples may be configured to acquire image data of an intra-luminal image via these networks, and to output an image processing result to various output devices (such as a viewer, and a printer) connected via these networks, and to store the image processing result in a memory device (such as a recording medium and a reading device thereof) connected via these networks.

The present invention is not limited to the first to fourth embodiments and their modified examples. Various inventions may be made by combining components disclosed in each embodiment or modified example as appropriate. For example, an invention may be made by using all the components disclosed in each embodiment or modified example from which some of the components are excluded or may be made by combining the components disclosed in the different embodiments and modified examples as appropriate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
 a processor comprising hardware, the processor implementing:
 a non-target region detecting unit that detects a region that is not to be examined as a non-target region from an image;
 a pixel-of-interest region setting unit that sets a pixel-of-interest region in a predetermined area including a pixel-of-interest position in the image;
 a surrounding region determining unit that determines a surrounding region, which is an area for acquiring information for use in forming a reference plane with respect to the pixel-of-interest position, based on a positional relationship between the non-target region and the pixelof-interest position, wherein the positional relationship further includes a boundary passing through the non-target region and the pixel-of-interest position, the boundary defining the area for acquiring information to include the pixel-of-interest position and not exceed the non-target region in the pixel-of-interest region as the surrounding region;

a reference plane forming unit that forms the reference plane based on the information in the surrounding region; and an outlier pixel detecting unit that detects an outlier pixel having a pixel value numerically distant from circumferential values based on a difference between corresponding quantities of the reference plane at each pixel position and of the original image.

2. The image processing device according to claim 1, wherein the surrounding region determining unit determines the surrounding region depending on classification of the non-target region.

3. The image processing device according to claim 2, wherein the surrounding region determining unit includes:
   a classifying unit that classifies the non-target region; and
   a classificatory surrounding region determining unit that determines the surrounding region by a method set depending on the classification of the non-target region.

4. The image processing device according to claim 3, wherein the classifying unit includes a continuity judging unit that judges continuity between a circumferential region of the non-target region and the non-target region.

5. The image processing device according to claim 4, wherein the continuity judging unit forms an approximate plane that approximates information in the circumferential region of the non-target region, and judges the continuity by comparing corresponding quantities of the approximate plane and of the image.

6. The image processing device according to claim 4, wherein the continuity judging unit judges the continuity based on a smoothed image that is the pixel-of-interest region smoothed based on information in the non-target region and the circumferential region of the non-target region.

7. The image processing device according to claim 4, wherein the classificatory surrounding region determining unit includes a switching unit that switches a method of determining the surrounding region depending on presence or absence of the continuity.

8. The image processing device according to claim 3, wherein the classifying unit includes a category classifying unit that classifies the non-target region into a plurality of categories depending on a method of detecting the non-target region.

9. The image processing device according to claim 8, wherein the categories include at least one of shadow, blood vessel, groove, bubble, and halation.

10. The image processing device according to claim 3, wherein the classificatory surrounding region determining unit includes a switching unit that switches a method of determining the surrounding region depending on a category of the non-target region.

11. The image processing device according to claim 3, wherein the surrounding region determining unit further includes a correcting unit that corrects information in the non-target region and the circumferential region of the non-target region.

12. The image processing device according to claim 11, wherein the correcting unit interpolates the information based on an average value of the information in the circumference of the non-target region.

13. The image processing device according to claim 11, wherein the correcting unit interpolates the information based on a function approximation using the information in the circumference of the non-target region.

14. The image processing device according to claim 1, wherein the reference plane forming unit forms the reference plane by calculating a weighted average of the information in the surrounding region using weighting factors corresponding to distances between the non-target region and the surrounding region.

15. The image processing device according to claim 1, wherein the reference plane forming unit forms the reference plane by function approximation based on the information in the surrounding region.

16. The image processing device according to claim 1, wherein the reference plane forming unit forms the reference plane by morphological operations with respect to the information in the surrounding region.

17. An image processing method comprising:
   detecting a region that is not to be examined from an image as a non-target region;
   setting a pixel-of-interest region in a predetermined area including a pixel-of-interest position in the image;
   determining a surrounding region that is an area for acquiring information used for forming a reference plane with respect to the pixel-of-interest position, based on a positional relationship between the non-target region and the pixel-of-interest position, wherein the positional relationship further includes a boundary passing through the non-target region and the pixel-of-interest position, the boundary defining the area for acquiring information to include the pixel-of-interest position and not exceed the non-target region in the pixel-of-interest region as the surrounding region;
   forming the reference plane based on the information in the surrounding region; and
   detecting an outlier pixel having a pixel value numerically distant from circumferential values based on a difference between corresponding quantities of the reference plane at each pixel position and of the original image.

18. A non-transitory computer readable recording medium with an executable program stored thereon, wherein the program instructs a processor to perform:
   detecting a region that is not to be examined from an image as a non-target region;
   setting a pixel-of-interest region in a predetermined area including a pixel-of-interest position in the image;
   determining a surrounding region that is an area for acquiring information used for forming a reference plane with respect to the pixel-of-interest position, based on a positional relationship between the non-target region and the pixel-of-interest position, wherein the positional relationship further includes a boundary passing through the non-target region and the pixel-of-interest position, the boundary defining the area for acquiring information to include the pixel-of-interest position and not exceed the non-target region in the pixel-of-interest region as the surrounding region;
   forming the reference plane based on the information in the surrounding region; and
   detecting an outlier pixel having a pixel value numerically distant from circumferential values based on a difference between corresponding quantities of the reference plane at each pixel position and of the original image.

* * * * *